(12) United States Patent
Loubet Moundi

(10) Patent No.: US 10,210,352 B2
(45) Date of Patent: Feb. 19, 2019

(54) DYNAMIC CHANGE OF SECURITY CONFIGURATIONS

(71) Applicant: GEMALTO SA, Meudon (FR)

(72) Inventor: Philippe Loubet Moundi, Gemenos (FR)

(73) Assignee: GEMALTO SA, Meudon (FR)

( * ) Notice: Subject to any disclaimer, the term of this patent is extended or adjusted under 35 U.S.C. 154(b) by 117 days.

(21) Appl. No.: 15/307,697

(22) PCT Filed: Apr. 13, 2015

(86) PCT No.: PCT/EP2015/057932
§ 371 (c)(1),
(2) Date: Oct. 28, 2016

(87) PCT Pub. No.: WO2015/169541
PCT Pub. Date: Nov. 12, 2015

(65) Prior Publication Data
US 2017/0053140 A1   Feb. 23, 2017

(30) Foreign Application Priority Data

May 7, 2014   (EP) .................................... 14305666

(51) Int. Cl.
*G06F 21/00*   (2013.01)
*G06F 21/75*   (2013.01)

(52) U.S. Cl.
CPC .................... *G06F 21/75* (2013.01)

(58) Field of Classification Search
CPC ....................................................... G06F 21/75
See application file for complete search history.

(56) References Cited

U.S. PATENT DOCUMENTS 5,533,123 A * 7/1996 Force ..................... G06F 21/10
380/2
6,272,637 B1   8/2001 Little et al.

OTHER PUBLICATIONS

International Search Report (PCT/ISA/210) dated Jul. 14, 2015, 2015, by the European Patent Office as the International Searching Authority for International Application No. PCT/EP2015/057932.
Written Opinion (PCT/ISA/237) dated Jul. 14, 2015, by the European Patent Office as the International Searching Authority for International Application No. PCT/EP2015/057932.

* cited by examiner

*Primary Examiner* — Beemnet W Dada
(74) *Attorney, Agent, or Firm* — Buchanan Ingersoll & Rooney PC

(57) ABSTRACT

The present invention relates to a method to provide a dynamic change of security configurations in an integrated circuit product adapted to execute at least a given critical process and susceptible to be attacked. The method comprises the steps of tracking successive executions of the given critical process, and after a given number of such executions, triggering a change of the security configuration.

7 Claims, 2 Drawing Sheets

DYNAMIC CHANGE OF SECURITY CONFIGURATIONS

FIELD OF THE INVENTION

The present invention relates to methods to counter attacks in an integrated circuit product adapted to execute at least a given critical process and susceptible to be attacked. The invention also pertains to an integrated circuit using said method.

BACKGROUND OF THE INVENTION

There is a constant need to increase system resistance against physical attacks. Such attacks generally require a huge number of executions of the same process to reach their target. For example, side-channel resistance characterization requires 1 million curves for DPA. Templates attacks require also in the learning phase a huge number of acquisitions. Fault attacks characterization is performed by scanning the integrated circuit with a laser. The number of laser shots for a single characterization can be ~100 000 shots.

In order to succeed, these attacks require previous synchronization and specific choice of parameters then used along the set of attacks. Once these first operations are done, the success of the attacks is only a question of time.

Some counter-attack methods are existing as random clock jitter, wait state desynchronization features but those protections are not increasing directly the difficulty to use a huge number of curves.

Some chips are thus implementing features where the clock is randomly changed. Error counters counting security alarms and killing cards after a given number of detections are also known.

Those counter-attack methods do not however provide a satisfying security and further alternative and advantageous solutions would, accordingly, be desirable in the art to be implemented in complement to these previous counter-attack methods.

SUMMARY OF THE INVENTION

The present invention aims at avoiding, or at least making more difficult the above-mentioned malicious attacks.

The invention proposes a method to provide a dynamic change of security configurations in an integrated circuit product adapted to execute at least a given critical process and susceptible to be attacked, wherein said method comprises the steps of:
tracking successive executions of the given critical process,
after a given number of such executions, triggering a change of the security configuration.

The invention provides a way to dynamically change the security settings of the product to make curves resynchronizations more complex and time consuming and to prevent laser automatic laser scan campaigns by changing the product configuration when a significant number of executions is detected. Such changes in the security configuration introduce a discontinuity and render non exploitable the curves obtained after this discontinuity.

The proposed solution will not impact the product performance in normal conditions where no attack is detected. This solution is further compatible with all existing countermeasures.

Therefore, the method according to the present invention allows reducing the risks of malicious attacks. At least, the attacks are more complex to carry out for a malicious attacker.

According to an advantageous feature of the invention, the step of tracking successive executions of the given critical process comprises counting the occurrences of a specific event occurring in the execution of the given critical process, such occurrences tracking the number of executions.

Successive detection of such a specific event enables to track the number of executions of the critical process. The choice of an easily detectable event enables to implement the invention.

According to an advantageous embodiment, specific event is warm reset of the integrated circuit product.

Warm resets are generally part of critical process and are easily detectable.

According to an advantageous implementation, a counter being used for the occurrences counting, it comprises a sub-step of incrementing or decrementing said counter at each occurrence of the specific event.

The implementation of a counter to count the successive executions enables to trigger change of security configurations for specific value of the counter.

Advantageously, said counter is randomly initialized.

This feature enables to introduce unpredictability in the number of executions after which the security configuration will be change.

According to a specific feature of the invention, a given security configuration is associated to a given interval of values of the counter.

Associating a security configuration to intervals of values of the counter enables a simple implementation of the dynamic change of security configurations of the invention.

According to a specific feature, said given interval is defined by fixed threshold values.

When a counter is used, the implementation of threshold values enables to define the given number of executions used in the invention.

According to an advantageous feature, said given interval is defined by programmable threshold values.

Programmable threshold enables to control the security level offered by the invention.

According to a preferred implementation, the method comprises a step of determining threshold values, a step of storing threshold values in a permanent memory and a step of loading the threshold values in dedicated registers during a cold reset, a sub-step of comparing the counter value with the threshold values stored in said dedicated registers and a sub-step of changing, before next given critical process execution, the security configuration according to said comparison.

This implementation enables to follow the successive executions of the critical process using simple well known elements.

According to a specific embodiment, said method further comprises sub-steps of:
detecting a specific communication mode,
selecting a specific security configuration associated to this communication mode.

This embodiment enables to take into account specific i/o interfaces.

According to a specific feature, said counter is set at a specific value associated to the specific security configuration.

This feature adapts security configurations while using the counter of the invention.

To implement the invention, security configurations are chosen among the group formed by clock frequency settings, clock configuration settings, side-channel protections, random process configurations.

Such security configurations are defined by a set of parameters under which the critical process is executed and which, when changed, render acquisition of successive curves non exploitable. The change of security configurations according to the invention is not a counterattack as it occurs independently from any detected attack. It is even less dependent of any nature of detected attack. It occurs only in relation with the number of executions of the critical process itself and not in relation with any failure ins the execution. No change in the critical process and in its successive execution is applied with the invention. The goal is not to react to any kind of attack by taking any appropriate action but only to change the security configurations for next executions and to continue to do the same functional process/execution but with different configuration parameters. Only the security configuration is changed according to the invention and the functionality of the device is preserved. It would not be the case in case of actions taken in case of threshold exceeded, for example in a context of detected attack.

Another goal is to have programmable threshold values for changing the configuration. The change of security configuration is based on "counters", that means the sequence of the changes are fixed, programmable but deterministic. The invention has a sequence of several thresholds.

The present invention also concerns integrated circuit products implementing the method to provide a dynamic change of security configurations according to the invention.

Advantageously, the integrated circuit product has a counter to implement the counting of the executions of the method according to the invention.

To the accomplishment of the foregoing and related ends, one or more embodiments comprise the features hereinafter fully described and particularly pointed out in the claims.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION OF EMBODIMENTS OF THE INVENTION

Figure 1:
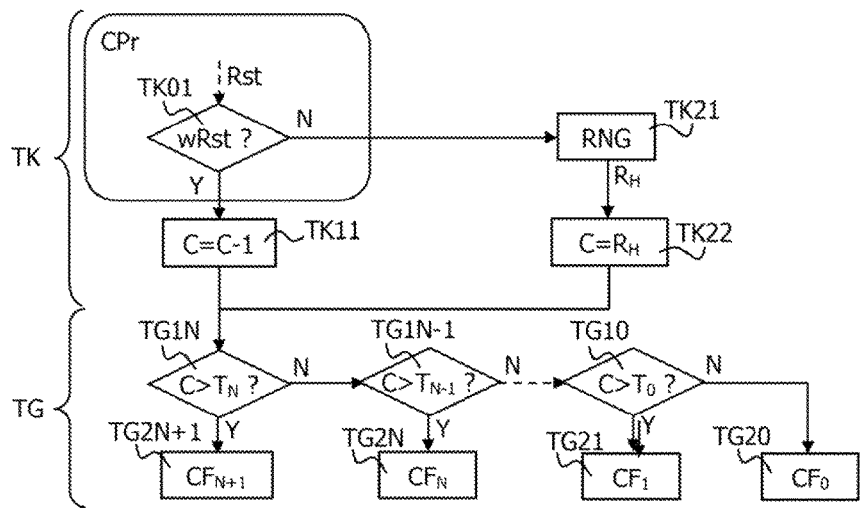
FIG. 1 schematically represents a first embodiment of the method of the invention.

The same elements have been designated with the same reference numerals in the different drawings. For clarity, only those elements and steps which are useful to the understanding of the present invention have been shown in the drawings and will be described.

FIG. 1 schematically represents a method of the invention according to a first embodiment. The method of the invention applies in the context of executions of a critical process CPr susceptible to be attacked in an integrated circuit product. It proposes to provide a dynamic change of security configurations. The counter-attack method of the invention comprises a first step TR of tracking the successive executions of the critical process.

Advantageously, said critical process is such that, during such executions, a specific event occurs. This specific event is used to track the successive executions of said critical process CPr.

As an illustrative example, the specific event is here a warm reset wRst of the integrated circuit product. Other specific events as execution of a specific crypto-routine, increment of a transaction counter, selection of a specific applet for Java card could be used.

Thus, in order to track the successive executions, warm and cold resets Rst of the integrated circuit product are investigated in a sub-step TK01.

In case of warm reset wRst, case Y, a counter C stored in volatile memory is decremented in a sub-step TK11. In case of other reset, typically a cold reset where the volatile memory is deleted, a random number generator RND is appealed in a sub-step TK21. A random number $R_H$ is generated and used to reinitialize the counter C in a sub-step TK22.

The randomization of the initial counter value is done within the most significant bits of the counter.

$T_0$ must be inferior to this minimum counter reset value to have at least two available security configurations.

Then the method comprises a step TG of triggering a change of security configuration. In the illustrative embodiment of FIG. 1, the counter C is compared to successive thresholds TN, TN−1 . . . T0 in successive sub-steps TG1N, TG1N−1, TG10. To each interval, above TN, between two of the successive thresholds, and below T0 corresponds a given security configuration CFN+1, CFN . . . CF1 and CF0. A given number of executions corresponding to the difference between the initial random value $R_H$ of the counter C and the highest threshold TN+1 is thus done. This first predetermined number of executions is thus random. Then a given number of executions corresponding to the difference between two successive thresholds are done.

The security configuration is thus changed after given numbers of executions in sub-steps TG2i as soon as a threshold value Ti is reached. The interval between thresholds can be the same or different from one time to another leading to same or different number of executions.

It can be here noted that the choice of the security configuration can also be randomized, preferably excluding the previously selected one.

The invention as embodied in FIG. 1 is a piece of code or a circuit that comprises a least a counter having the following properties:
  the value after a cold reset is set by a random value that seeds the more significant bits of the counter. The less significant bits are set to the minimum reset counter value;
  the counter is decremented at each warm reset.

The invention comprises, at least, several security configurations being a set or a subset of clock frequency settings, clock configuration settings, side-channel protections, random process configuration or any other features that affect chip security configuration.

The invention associates, at least, a security configuration for a given range of counter values. These given ranges are defined by thresholds values, fixed (for example stored in ROM memory) or programmable.

For programmable option, the threshold values are stored in a non volatile memory, e.g. EEPROM, Flash, and loaded in corresponding dedicated registers during cold reset.

The invention comprises a way to compare the counter value with the threshold values and to change the security configuration accordingly to the threshold value during startup, thus after reset signal and before critical code execution, of the device.

Figure 2:
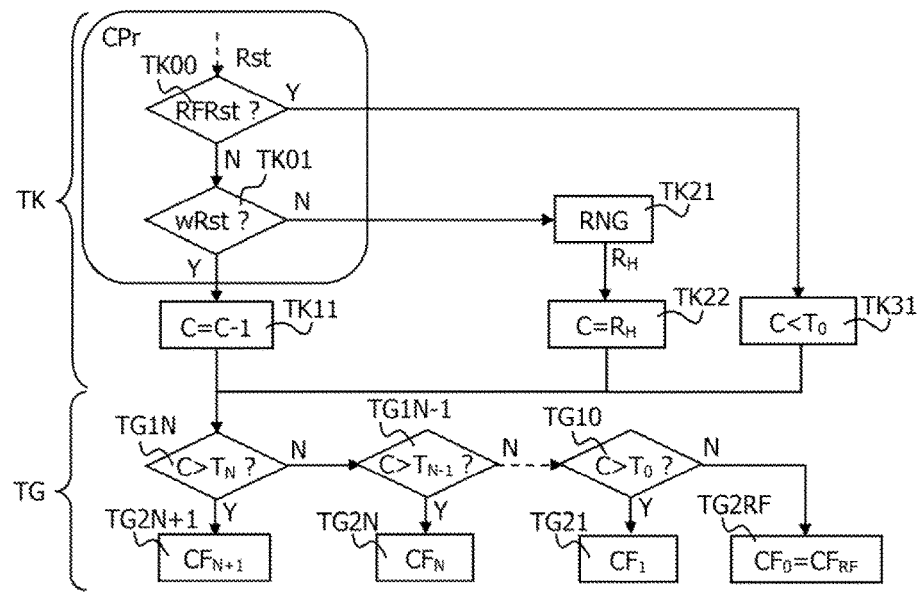
FIG. 2 schematically represents a second embodiment of the method of the invention.

FIG. 2 schematically represents a method of the invention according to a second embodiment. This embodiment concerns products having multi-in/out interfaces. In this embodiment, the invention is linked with a detection of an used communication interface. In the example shown on FIG. 2, the in-out interface is an RF one.

According to this embodiment, a sub-step TK00 of detecting an RF mode when a reset Rst occurs is added. In the case of an RF reset (Y case), the counter C is set to a dedicated value in a sub-step TK31 in order to select an RF security configuration in the following. Here the value is illustratively a value inferior to the above mentioned $T_0$ value. Thus, in sub-step TG10, when the counter is detected below $T_0$ (case N), the RF security configuration $CF_{RF}$ is selected in a sub-step TG2RF.

In case the reset Rst is not an RF reset (N case in sub-step TK00), the method as disclosed in FIG. 1 is applied.

Figure 3:
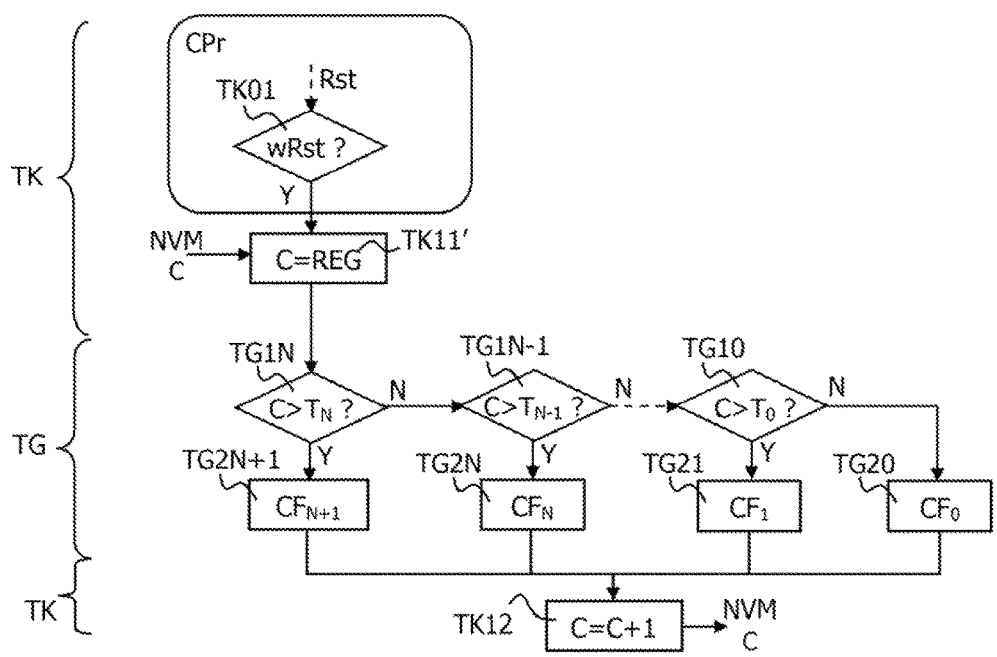
FIG. 3 schematically represents a third embodiment of the method of the invention.

FIG. 3 schematically represents a method of the invention according to a third embodiment. This embodiment proposes to store a counter value C in persistent memory. Cold resets will thus not delete this value. The value is thus initialized to a fixed value, typically during personalization. This fixed value can be a random number but chosen once in the product life time contrarily to the previous embodiment where the counter value is stored in volatile memory. Thus, in that case, the security configuration and the threshold values must be chosen to provide counter values ranges compatible with the product life.

Here it is possible to know exactly where the threshold values must be chosen in the product life. For example, if the card usage is limited to a given number of transactions, the thresholds must be inferior to this number and spread in the interval while the related security configurations must be chosen not to impact the product performance.

In this embodiment, a counter register REG is reloaded in a sub-step TK11' with the stored counter value C after a warm reset is detected in the sub-step TK01 (case Y). To implement this embodiment, the tracking step TK further includes a sub-step TK12 of incrementing the counter value C at each execution before storing it in non volatile memory NVM, e.g. Flash.

The step TG of triggering the change of security configuration CFi is similar to the one described in previous figures; except that the security configurations are chosen from $CF_0$ to $CF_{N+1}$ as counter C is here incremented.

In comparison with a random security configuration applied at each reset, successive executions of the same process will benefit from the same security configuration. However, if warm reset are performed a significant number of times, abnormal for the current application, the security configuration is changed automatically with the invention.

By consequence, for side-channel analysis when attackers performs huge numbers of acquisitions, this will require dedicated curves ranking and additional signal processing per set of curves.

For laser scanning attack, the correct set up found for the first executions, will not be valid anymore once the first threshold will be reached during the scanning and the attacker will need to change the laser set up.

For specific mode usage, this feature could be bypassed by correctly adjusting the threshold or the associated security configurations. For example, for RF mode, if a specific clock frequency must be selected for RF security configuration, the invention is compatible with such a requirement.

This invention could be implemented in hardware or in software. This invention is compatible with other counter measures already implemented in integrated circuit products as tearing counter, faults counter . . . .

Integrated circuit products interested by the invention implement a critical process. They have advantageously a random number generator, a counter and memory to store security configurations parameters and counter thresholds among others.

In the above detailed description, reference is made to the accompanying drawings that show, by way of illustration, specific embodiments in which the invention may be practiced. These embodiments are described in sufficient detail to enable those skilled in the art to practice the invention. The above detailed description is, therefore, not to be taken in a limiting sense, and the scope of the present invention is defined only by the appended claims, appropriately interpreted, along with the full range of equivalents to which the claims are entitled.

The invention claimed is:

1. A method to provide a dynamic change of security configurations in an integrated circuit product adapted to execute at least a given critical process and susceptible to be attacked,
    wherein said method comprises the steps of:
        tracking successive executions of the given critical process, by counting with a counter the occurrences of a specific event occurring in the execution of the given critical process, such occurrences tracking the number of executions, said method being such that it comprises a sub-step of incrementing or decrementing the counter at each occurrence of the specific event, and
        after a given number of such executions, triggering a change of the security configuration, a given security configuration being associated with a given interval of values of the counter, said given interval being defined by programmable threshold values,
    the method further comprising a step of determining the threshold values, a step of storing the threshold values in a permanent memory and a step of loading the threshold values in dedicated registers during a cold reset, a sub-step of comparing the counter value with the threshold values stored in said dedicated registers and a sub-step of changing, before a next given critical process execution, the security configuration according to said comparison.

2. The method according to claim 1, wherein the specific event is warm reset of the integrated circuit product.

3. The method according to claim 1, wherein said counter is randomly initialized.

4. The method according to claim 1, wherein said method further comprises sub-steps of:
    detecting a specific communication mode,
    selecting a specific security configuration associated to the detected communication mode.

5. The method according to claim 4, wherein said counter is set at a specific value associated to the specific security configuration.

6. The method according to claim 1, wherein security configurations are chosen among the group formed by clock frequency settings, clock configuration settings, side-channel protections, and random process configurations.

7. An integrated circuit product implementing a dynamic change of security configurations to be adapted to execute at least a given critical process and susceptible to be attacked, said integrated circuit having a counter to track successive executions of the given critical process by counting the occurrences of a specific event occurring in the execution of the given critical process, such occurrences tracking the number of executions and incrementing or decrementing the counter at each occurrence of the specific event, a given security configuration being associated with a given interval of values of the counter, said integrated circuit further comprising registers to implement programmable threshold values that define said interval and permanent memory to store the threshold values, said threshold values being loaded in dedicated registers during a cold reset, the counter value being then compared with the threshold values stored in said dedicated registers, the security configuration being changed according to said comparison before next given critical process execution.

* * * * *